(12) United States Patent
Jockenhoevel et al.

(10) Patent No.: US 8,938,966 B2
(45) Date of Patent: Jan. 27, 2015

(54) STORAGE OF ELECTRICAL ENERGY WITH THERMAL STORAGE AND RETURN THROUGH A THERMODYNAMIC CYCLE

(75) Inventors: Tobias Jockenhoevel, Nürnberg (DE); Norbert König, Baiersdorf (DE); Rainer Nies, Uttenreuth (DE); Nicolas Vortmeyer, Erlangen (DE); Erik Wolf, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 1172 days.

(21) Appl. No.: 12/921,415

(22) PCT Filed: Mar. 5, 2009

(86) PCT No.: PCT/EP2009/052604
§ 371 (c)(1),
(2), (4) Date: Dec. 29, 2010

(87) PCT Pub. No.: WO2009/112421
PCT Pub. Date: Sep. 17, 2009

(65) Prior Publication Data
US 2011/0083443 A1    Apr. 14, 2011

(30) Foreign Application Priority Data
Mar. 12, 2008 (EP) .................... 08004589

(51) Int. Cl.
*F02C 1/05*    (2006.01)
*F01D 15/00*    (2006.01)
(Continued)

(52) U.S. Cl.
CPC . *F02C 1/05* (2013.01); *F01D 15/00* (2013.01); *F01K 3/186* (2013.01); *F01K 13/006* (2013.01);
(Continued)

(58) Field of Classification Search
CPC ............ F01K 1/00; F01K 3/18; F01K 23/10; F01K 23/106; F01K 3/186; F01K 13/006; F02C 7/224; F02C 1/05; F02C 6/14; Y02E 20/16; F01D 15/00; F05D 2220/60; F05D 2220/64
USPC ................. 60/659, 39.182, 39.511, 736, 727, 60/39.12, 641.8–641.15
See application file for complete search history.

(56) References Cited

U.S. PATENT DOCUMENTS 3,974,642 A * 8/1976 Pacault ...................... 60/39.182
4,262,484 A    4/1981 Jubb
(Continued)

FOREIGN PATENT DOCUMENTS

CN    1097842 A    1/1995
DE    2757306 A1    7/1979
(Continued)

OTHER PUBLICATIONS

E A Manuschin, Gasowyje turbiny problemy i perspektivy, pp. p. 16, Abb 1 5/2, Enegroatomizdat , Moskau, 1986, RU.

*Primary Examiner* — William H Rodriguez
*Assistant Examiner* — Carlos A Rivera

(57) ABSTRACT

A device and a method for using overcapacities in the power grid is provided. In case of an oversupply of energy, the energy is transferred to a thermal storage device directly via a heating element and in the discharge case of the thermal storage device the heat is removed from the thermal storage device and made available to a thermodynamic cycle whereby electrical energy is produced. The heat from the thermal storage device is used to preheat air in an air feed line to a combustion chamber, or fuel is pre-heated using heat from the thermal storage device.

15 Claims, 3 Drawing Sheets

(51) Int. Cl.
  *F01K 3/18* (2006.01)
  *F01K 13/00* (2006.01)
  *F01K 23/10* (2006.01)
  *F02C 6/14* (2006.01)

(52) U.S. Cl.
  CPC . *F01K 23/10* (2013.01); *F02C 6/14* (2013.01); *Y02E 20/16* (2013.01); *F05D 2220/60* (2013.01); *F05D 2220/64* (2013.01)
  USPC ........... 60/659; 60/641.8; 60/736; 60/39.511; 60/39.182; 60/39.12

(56) References Cited

U.S. PATENT DOCUMENTS

| | | | |
|---|---|---|---|
| 4,347,706 A * | 9/1982 | Drost | 60/659 |
| 4,720,968 A * | 1/1988 | Knizia | 60/772 |
| 4,896,498 A * | 1/1990 | Knizia | 60/773 |
| 5,284,489 A | 2/1994 | Liu et al. | |
| 5,327,717 A * | 7/1994 | Hauk | 60/781 |
| 5,384,489 A | 1/1995 | Bellac | |
| 5,634,340 A * | 6/1997 | Grennan | 60/652 |
| 5,685,155 A | 11/1997 | Brown | |
| 5,778,675 A * | 7/1998 | Nakhamkin | 60/652 |
| 6,065,280 A * | 5/2000 | Ranasinghe et al. | 60/774 |
| 6,560,966 B1 * | 5/2003 | Fetescu et al. | 60/775 |
| 7,086,231 B2 * | 8/2006 | Pinkerton | 60/650 |
| 2007/0132249 A1 | 6/2007 | Ford | |

FOREIGN PATENT DOCUMENTS

| | | |
|---|---|---|
| EP | 1577548 A1 | 9/2005 |
| EP | 1577549 A1 | 9/2005 |
| RU | 0046497 A | 3/1996 |
| RU | 2325551 C1 | 5/2008 |
| WO | WO 2006007733 A1 | 1/2006 |
| WO | WO 2007134466 A1 | 11/2007 |

* cited by examiner

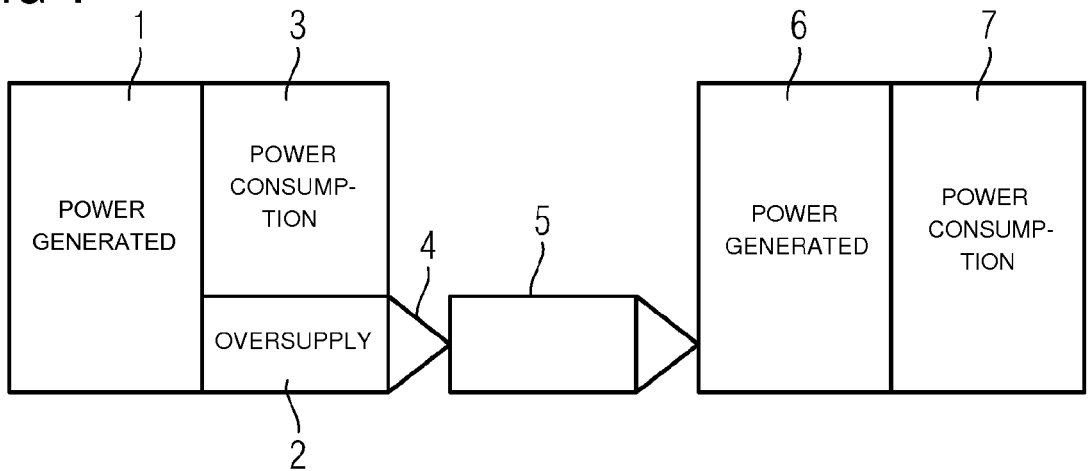
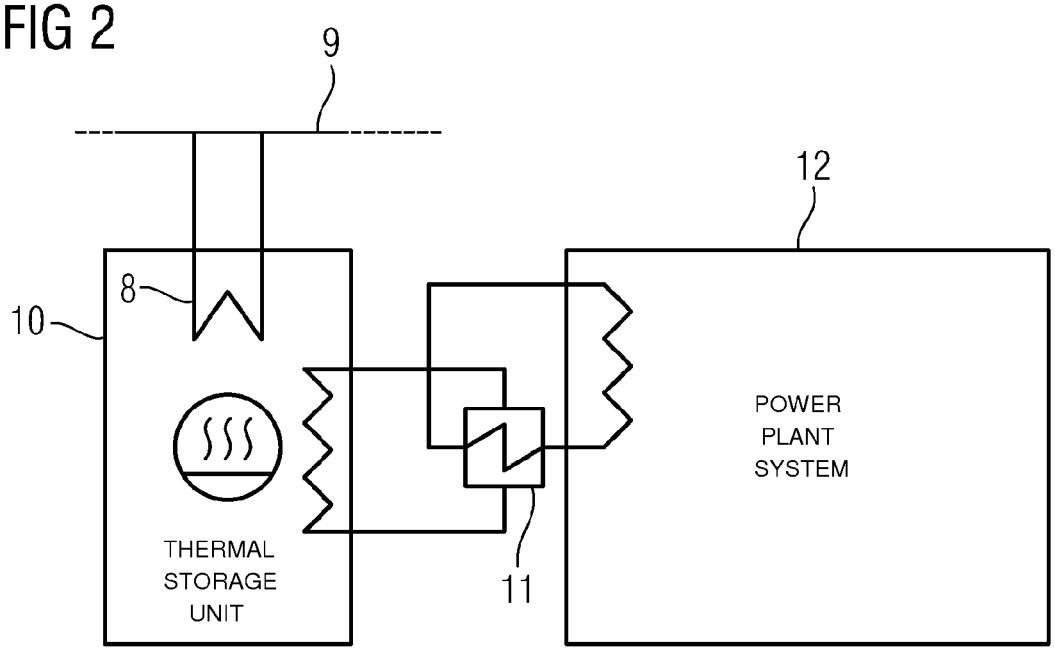

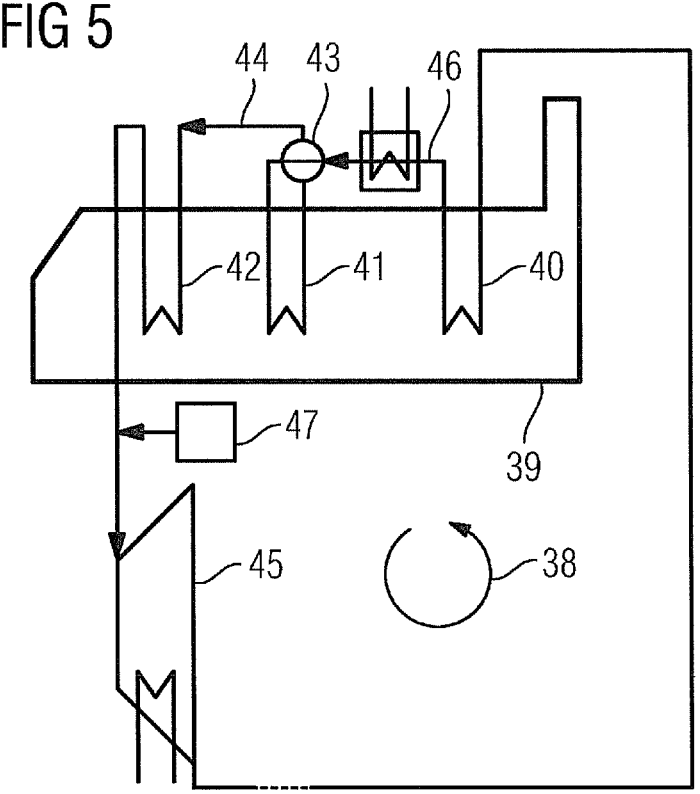

STORAGE OF ELECTRICAL ENERGY WITH THERMAL STORAGE AND RETURN THROUGH A THERMODYNAMIC CYCLE

CROSS REFERENCE TO RELATED APPLICATIONS

This application is the US National Stage of International Application No. PCT/EP2009/052604, filed Mar. 5, 2009 and claims the benefit thereof. The International Application claims the benefits of European Patent Office application No. 08004589.1 EP filed Mar. 12, 2008. All of the applications are incorporated by reference herein in their entirety.

FIELD OF INVENTION

The invention relates to an apparatus and method for utilizing overcapacities in the power network.

BACKGROUND OF INVENTION

In the electrical network the power generated and consumption must always be in equilibrium. The extensive development of renewable energies means that sometimes there are significant overcapacities available. It is possible to manage the oversupply of controllable renewable energies in a number of ways; for example the fluctuating supply can be compensated for by increasing or reducing the capacity of conventional power plants, resulting renewable energy could not be fed into the network, in other words wind turbines could be deactivated, or the energy could be stored in an energy storage system, in other words in pumped storage power plants, compressed air storage power plants or batteries with high levels of system complexity and high costs in some instances.

EP 1 577 548 A1 and EP 1 577 549 A1 describe an apparatus and method for storing energy and generating power. A thermal storage unit is heated using electrical energy generated from renewable energies such wind or solar energy. The heat is used as required in the thermal storage unit to generate steam, which is fed directly to a thermodynamic process in a steam turbine, steam generation optionally being supplemented by conventional means.

U.S. Pat. No. 5,384,489 describes an apparatus in which electrical energy is generated by wind energy and used to operate a heating element to heat a fluid in a storage tank and an apparatus for extracting the stored energy from the tank again. The energy extracted from the storage tank is used for space heating/space cooling, general cooling and desalination but preferably for steam generation for generating electrical power.

SUMMARY OF INVENTION

The object of the invention is to propose a more efficient apparatus and method for utilizing overcapacities in the power network.

According to the invention this object is achieved by the features of the claims.

Further advantageous embodiments are set out in the subclaims.

One disadvantage of the apparatuses and methods of the prior art is that the quality and quantity of the steam generated in the thermal storage unit are not always adequate for operating a steam turbine, making conventional subsequent firing necessary. Apparatuses and methods of the prior art are also limited to one medium, namely steam, for power generation.

In contrast the inventive apparatus aims to utilize the overcapacities in the power network for a number of different heat consumers and therefore provides for a thermal storage unit and a heating element for storing energy from the power network in the thermal storage unit and a heat exchanger having a primary side and a secondary side, the primary side being coupled thermally to the thermal storage unit for extracting heat from the thermal storage unit and the secondary side being connected to a power plant system, the power plant system to which the heat exchanger is connected comprising a gas turbine.

The thermal storage unit is therefore not only used to generate steam which is fed directly to a steam turbine.

In one advantageous embodiment of the invention the heat exchanger is connected on the secondary side to an air supply line of a burner to preheat the air.

It is likewise advantageous if the heat exchanger is connected on the secondary side to a fuel supply line to preheat the fuel.

It is also expedient if the heat exchanger is connected on the secondary side to the flow of combustion gases for their intermediate superheating.

In a further advantageous embodiment of the invention however the heat exchanger can also be connected to a power plant system containing a steam turbine.

It is expedient then to connect the heat exchanger on the secondary side to the steam flow for intermediate superheating.

It is also expedient if the heat exchanger is connected on the secondary side to the water/steam circuit in the manner of a preheater.

It is also expedient if the heat exchanger is used for coal drying.

In one particularly advantageous combination of a gas and steam turbine, which comprises a waste heat steam generator for generating steam for the steam turbine by means of heat from the waste gases of the gas turbine, the feedwater preheater in the waste heat steam generator can be replaced or supplemented by a heat exchanger, which is connected on the primary side to the thermal storage unit.

In the inventive method, to utilize overcapacities in the power network when there are overcapacities of energy, such energy is fed directly into a thermal storage unit by way of a heating element and when said thermal storage unit is discharged, the heat is extracted from the thermal storage unit and made available to a thermodynamic cycle, for example an existing power plant process, the heat from the thermal storage unit being used to preheat air in an air supply line of a combustion chamber, in particular a gas turbine system, or fuel being preheated using heat from the thermal storage unit.

Both preheating operations reduce fuel consumption. Preheating therefore increases the overall efficiency of the gas turbine system for an almost identical output of the gas turbine.

A high energy yield can also be achieved by intermediate superheating of the waste gas flow in a turbine of a gas turbine.

In a further advantageous embodiment of the invention a steam flow in a steam turbine undergoes intermediate superheating using heat from the thermal storage unit.

However it can also be expedient at another point in the water/steam circuit to preheat the water using heat from the thermal storage unit, for example if the heat content of the thermal storage unit is not sufficient for intermediate superheating in the turbine.

Coal can also be dried using the heat from the thermal storage unit, so that there is no need to divert high-quality steam from the steam turbine process.

It is particularly advantageous, due to the minimal conversion losses, to use water as the heat-carrying medium on the secondary side of the heat exchanger, which is connected on the primary side to the thermal storage unit, and to feed the steam generated by the heat in the thermal storage unit directly into a steam turbine.

BRIEF DESCRIPTION OF THE DRAWINGS

The invention is described in more detail below in an exemplary manner with reference to drawings, in which:

FIG. 1 shows a schematic diagram of the concept of storing electrical energy with a thermal storage unit and conversion back to electricity by means of a thermodynamic cycle, FIG. 2 shows a schematic diagram of the inventive apparatus with heating element, thermal storage unit and heat exchanger, FIG. 5 shows a waste heat steam generator in a gas and steam system with direct steam and intermediate superheating.

Essentially identical elements are in principle designated with the same reference characters.

DETAILED DESCRIPTION OF INVENTION

Figure 3:
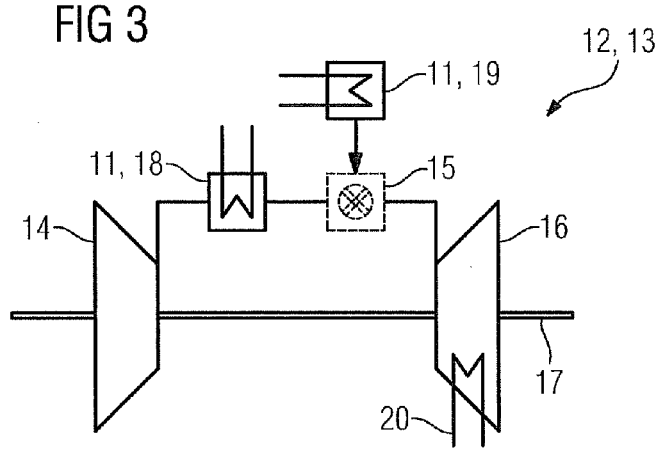
FIG. 3 shows a gas turbine system with air preheating, fuel preheating and intermediate superheating.

FIG. 1 describes the inventive method for utilizing overcapacities in the power network. If at a time t1 the power 1 generated exceeds consumption 3 in the network, the oversupply 2 of electrical energy is stored 4 directly in a thermal storage unit, for example a salt storage unit or concrete thermal storage unit, by way of a heating element.

When this energy storage system is discharged, for example when there is a greater demand for power in the power network, the heat is extracted from the thermal storage unit again and fed to a power plant system 5 by way of a heat exchanger, the primary side of which is coupled thermally to the thermal storage unit and the secondary side of which is connected to a power plant system, so that the power 6 generated at time t2 covers demand 7 at time t2.

FIG. 2 shows the essential components of the inventive apparatus for utilizing overcapacities in the power network. Electrical energy from the power network 9 can be stored directly in the thermal storage unit 10 by way of a heating element 8. The primary side of the heat exchanger 11 is coupled thermally to the thermal storage unit 10. The secondary side of the heat exchanger 11 is connected to a power plant system 12.

The power plant system 12 according to FIG. 3 features a gas turbine 13 and comprises a compressor 14 for compressing the air which is then fed to a combustion chamber 15 and combusted with fuel. The hot combustion gases drive the turbine 16, which is coupled by way of a shaft 17 to the compressor 14. Heat from the thermal storage unit 10 can be used by way of heat exchangers 11 both to preheat 18 the compressed air and to preheat the fuel 19.

The combustion chamber 15 is optionally deactivated completely and the turbine 16 is driven simply by the compressed air heated by way of a heat exchanger 11. Intermediate superheating 20 expediently takes place in the region of the turbine 16.

Figure 4:
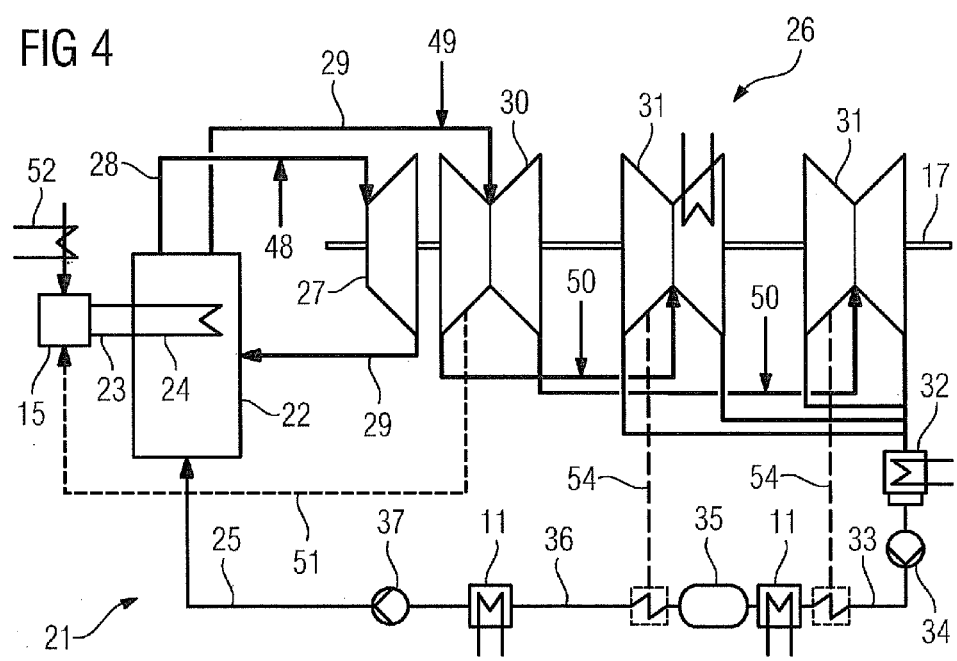
FIG. 4 shows a steam turbine system, in which the steam generated by means of heat from the thermal storage unit is routed directly into the steam turbine, preheats the condensate and/or predries the fuel

The power plant system according to FIG. 4 features a steam power plant 21 and comprises a combustion chamber 15, to which a fuel and an oxidation agent can be fed by way of a supply system. The heat released from the combustion chamber 15 during combustion of the fuel can be transferred to a steam generator 22. In the exemplary embodiment this is indicated by a waste gas line 23 passing out of the combustion chamber 15 by way of a heat exchanger 24 disposed in the steam generator 22. However any other type of suitable heat transfer from the combustion chamber 15 to the steam generator 22 is of course possible, for example by way of direct firing.

A steam turbine 26 is connected to the steam generator 22 by way of a water/steam circuit 25, said steam turbine 26 being driven by way of a shaft 17 of a generator (not shown in detail). In the exemplary embodiment the steam turbine 26 is embodied in three stages and comprises a high-pressure part 27, which is connected on the input side to the steam generator 22 by way of a steam line 28. On the output side the high-pressure part 27 is connected to the downstream medium-pressure part 30 of the steam turbine 26 by way of a superheater line 29 passed by way of the steam generator 22. The sub-turbines of the medium-pressure part 30 are in turn connected on the output side to the low-pressure parts 31 of the steam turbine 26.

Instead of the steam turbine 26 thus embodied in three stages it is of course also possible to provide a two-stage or other type of suitably selected steam turbine.

The low-pressure part 31 of the steam turbine 26 is connected on the outflow side to a condenser 32, in which the expanded steam flowing out of the steam turbine 26 is condensed.

The condenser 32 is in turn connected on the output side to a feedwater vessel 35, in which the condensed water is temporarily stored, by way of a condensate line 33, to which a condensate pump 34 is connected. This feedwater vessel 35 is connected on the feedwater side by way of a feedwater line 36, to which a feedwater pump 37 is connected, to the steam generator 22, so that the water can be fed back to the steam boiler and a closed water/steam circuit 25 results.

To improve efficiency, regenerative feedwater preheating generally takes place, in the course of which the feedwater is preheated using tapped steam 54 from the low-pressure part 31 of the steam turbine 26 for example, before it is fed back into the steam generator 22.

In the inventive apparatus there is no need for such feedwater preheating, so the steam generally required for this purpose can be utilized to generate energy. Instead heat exchangers 11 are connected to the condensate line 33 and the feedwater line 36 on the secondary side, being connected to the thermal storage unit 10 on the primary side and being intended to insure the injection of the heat of the thermal storage unit 10 into the water/steam circuit 25 of the steam generator 22.

The heat in the thermal storage unit 10 can also be used to generate steam, which is then fed directly into the steam turbine 26. One possible feed-in point 48 is the steam line 28 leading to the high-pressure part 27 of the turbine 26. The generated steam can however also be fed 49 into the superheater line 29. Finally it is also possible to feed the steam into the steam lines between the medium-pressure part 30 and the low-pressure part 31 of the turbine 26.

Steam-heated dryers are generally used to predry fuel, being heated to some degree using high-temperature steam from the water/steam circuit of the power plant process. To reduce the proportion of steam 51 required from the power plant process, it is also possible here to use heat from the thermal storage unit 10 to predry the fuel 52.

FIG. 5 shows a schematic diagram of the steam circuit 38 of a gas and steam power plant having a waste heat steam generator 39 and its essential components—a feedwater preheater 40, evaporator 41 and superheater 42. The waste gases of a gas turbine (not shown) heat water and generate steam in successive steps in the waste heat steam generator 39.

In the feedwater preheater 40 the residual heat of the gas turbine waste gas is used to preheat the feedwater before it reaches the steam boiler 43, thereby reducing the energy requirement of the evaporator 41. The steam passes by way of a collection line 44 in the top of the steam boiler 43 into the superheater 42, where the temperature and pressure rise further.

The steam is routed to the high-pressure turbine 45, the first of a multi-stage turbine process.

In the inventive apparatus the feedwater preheater 40 can either be supplemented by supplying heat 46 from the thermal storage unit 10 or even replaced. Alternatively or additionally however steam can also be generated directly using the heat from the thermal storage unit 10 and mixed in 47 with the steam generated in the waste heat steam generator.

The invention claimed is:

1. An apparatus for utilizing overcapacities in a power network, comprising:
   a thermal storage unit;
   a heating element that stores energy from the power network in the thermal storage unit in the event of an oversupply of energy from the power network; and
   a heat exchanger including a primary side and a secondary side,
   wherein the primary side is coupled thermally to the thermal storage unit for extracting heat from the thermal storage unit,
   wherein the secondary side is connected to a power plant system,
   wherein the power plant system includes a compressor, a combustion chamber and a gas turbine,
   wherein the heat exchanger is thermally coupled on the secondary side to a fuel supply line of the combustion chamber, whereby a fuel being supplied to the combustion chamber is preheated via heat exchange with the secondary side,
   wherein the heat exchanger is further thermally coupled on the secondary side to an air supply line of the combustion chamber in order to preheat air, wherein the preheated fuel and air obtained with the heat extracted from the thermal storage unit increases thermal efficiency of the gas turbine without diverting thermal energy from a thermodynamic cycle of the power plant system.

2. The apparatus as claimed in claim 1, wherein the heat exchanger is further thermally coupled on the secondary side to a waste gas flow in a turbine of the gas turbine for intermediate superheating.

3. The apparatus as claimed in claim 1, wherein the power plant system also includes a steam turbine.

4. The apparatus as claimed in claim 3, wherein the heat exchanger is further thermally coupled on the secondary side to a steam flow in the steam turbine for intermediate superheating.

5. The apparatus as claimed in claim 3, wherein the heat exchanger is further thermally coupled on the secondary side to a water/steam circuit in the manner of a preheater.

6. The apparatus as claimed in claim 3, wherein the heat exchanger is further thermally coupled on the secondary side to a predrying/coal drying unit.

7. The apparatus as claimed in claim 1, wherein the power plant system is a gas and steam system and includes a waste heat steam generator.

8. The apparatus as claimed in claim 7, wherein the heat exchanger replaces a feedwater preheater in the waste heat steam generator.

9. The apparatus as claimed in claim 7, wherein the heat exchanger is further thermally coupled on the secondary side to a steam flow in a steam turbine of the gas and steam system for intermediate superheating.

10. A method for utilizing overcapacities in a power network, comprising:
    transferring energy, directly, in the event of an oversupply of energy by way of a heating element to a thermal storage unit;
    extracting heat from the thermal storage unit when the thermal storage unit is discharged;
    injecting the heat indirectly using a heat exchanger process via a heat exchanger into a thermodynamic cycle whereby electrical energy is generated by a power plant system including a compressor, a combustion chamber and a gas turbine, wherein the heat exchanger is thermally coupled to the thermal storage unit on a primary side; and
    feeding the heat from the thermal storage unit to the gas turbine,
    wherein the heat exchanger is thermally coupled on the secondary side to a fuel supply line of the combustion chamber and to an air supply line of the combustion chamber,
    wherein the method further comprises using the heat from the thermal storage unit to preheat a fuel in the fuel supply line of the combustion, whereby the fuel is preheated via the heat exchange process, and using the heat from the thermal storage unit to preheat air in the air supply line of the combustion chamber, wherein the preheated fuel and air obtained with the extracting of heat from the thermal storage unit increases thermal efficiency of the gas turbine without diverting thermal energy from the thermodynamic cycle of the power plant system.

11. The method as claimed in claim 10, wherein a waste gas flow in a turbine of the gas turbine also undergoes intermediate superheating using the heat from the thermal storage unit.

12. The method as claimed in claim 10, wherein a steam flow in a steam turbine undergoes intermediate superheating using the heat from the thermal storage unit.

13. The method as claimed in claim 10, wherein water in a water/steam circuit is preheated using the heat from the thermal storage unit.

14. The method as claimed in claim 10, wherein coal is dried using the heat from the thermal storage unit.

15. The method as claimed in claim 10, wherein the heat from the thermal storage unit evaporates water and steam is fed directly into a steam turbine.

* * * * *